United States Patent
Sakai

Patent Number: 5,677,807
Date of Patent: Oct. 14, 1997

[54] METHOD AND APPARATUS FOR GENERATING A CONTROL SIGNAL

[75] Inventor: Nobuhiro Sakai, Kanagawa, Japan

[73] Assignee: Sony Corporation, Tokyo, Japan

[21] Appl. No.: 719,902

[22] Filed: Sep. 25, 1996

Related U.S. Application Data

[63] Continuation of Ser. No. 454,617, May 31, 1995, abandoned, which is a continuation of Ser. No. 135,743, Oct. 12, 1993, abandoned.

[30] Foreign Application Priority Data

Oct. 13, 1992 [JP] Japan ................................ 4-274559

[51] Int. Cl.$^6$ .................................................. G11B 5/584
[52] U.S. Cl. ..................... 360/77.13; 360/64; 386/76
[58] Field of Search ............................ 360/26, 27, 15, 360/70, 73.05, 73.04, 73.01, 71, 61, 64, 77.13, 77.12, 77.01; 386/76, 68, 72, 47

[56] References Cited

U.S. PATENT DOCUMENTS

| | | | |
|---|---|---|---|
| 3,733,443 | 5/1973 | Iwawaki et al. | 360/15 X |
| 4,306,255 | 12/1981 | Misaki et al. | 360/73.05 X |
| 4,644,414 | 2/1987 | Yamada et al. | 360/77.14 X |
| 5,012,358 | 4/1991 | Kohsaka | 360/70 |

FOREIGN PATENT DOCUMENTS 02292770  12/1990  Japan.

Primary Examiner—Andrew L. Sniezek
Attorney, Agent, or Firm—Jay H. Maioli

[57] ABSTRACT

A method of generating a control signal is comprised of the steps of detecting a drum rotational amount on the basis of a switching signal which switches a plurality of rotary heads, detecting a displacement amount of a control signal on the basis of a signal indicative of the drum rotational amount and levels of reproduced signals from the plurality of rotary heads, detecting a rotary frequency of a capstan motor, generating a pseudo control signal by frequency-dividing a detected signal indicative of the rotary frequency of the capstan motor by a predetermined value, and correcting a phase of the pseudo-control signal generated on the basis of the signal indicative of the displacement amount of the control signal.

1 Claim, 6 Drawing Sheets

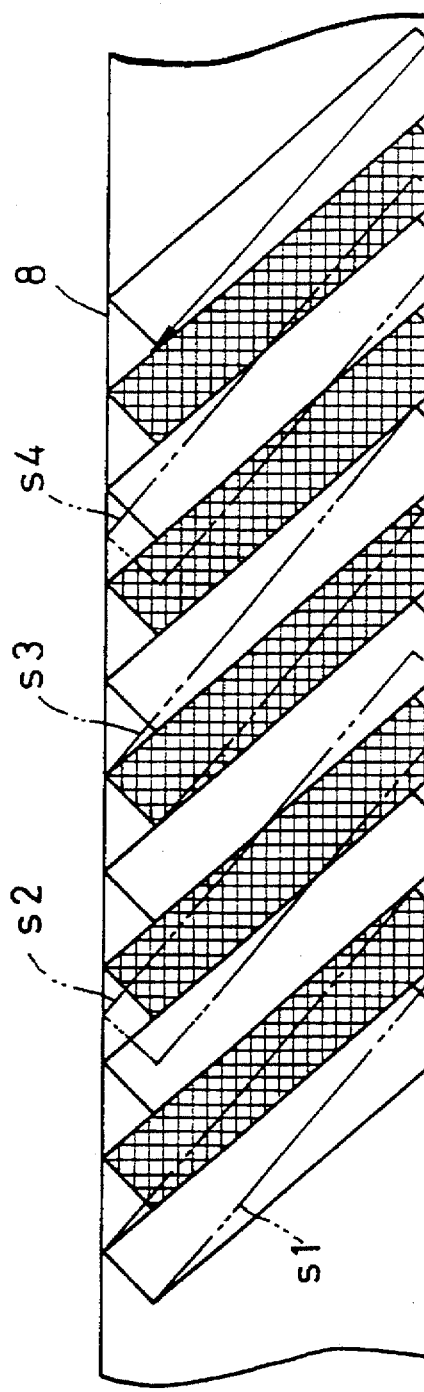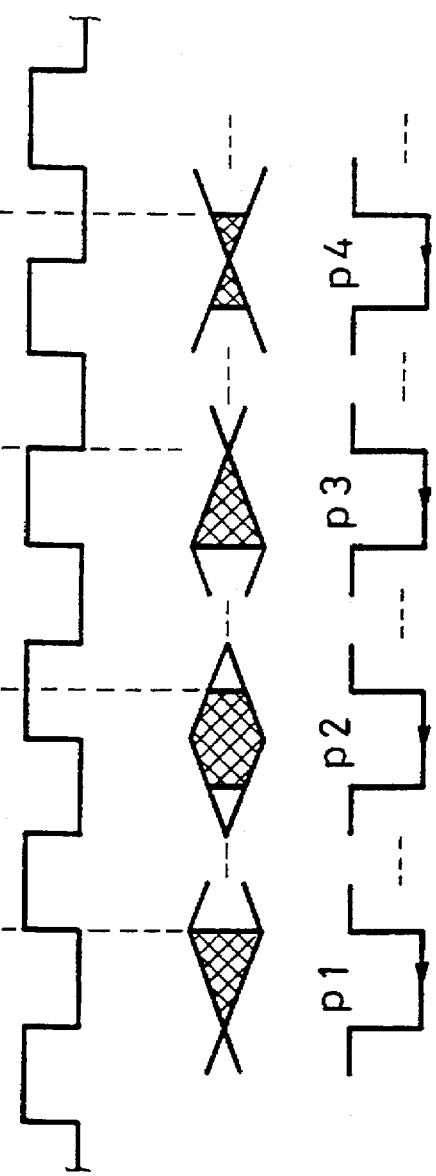
FIG. 2A
FIG. 2B
FIG. 2C
FIG. 2D

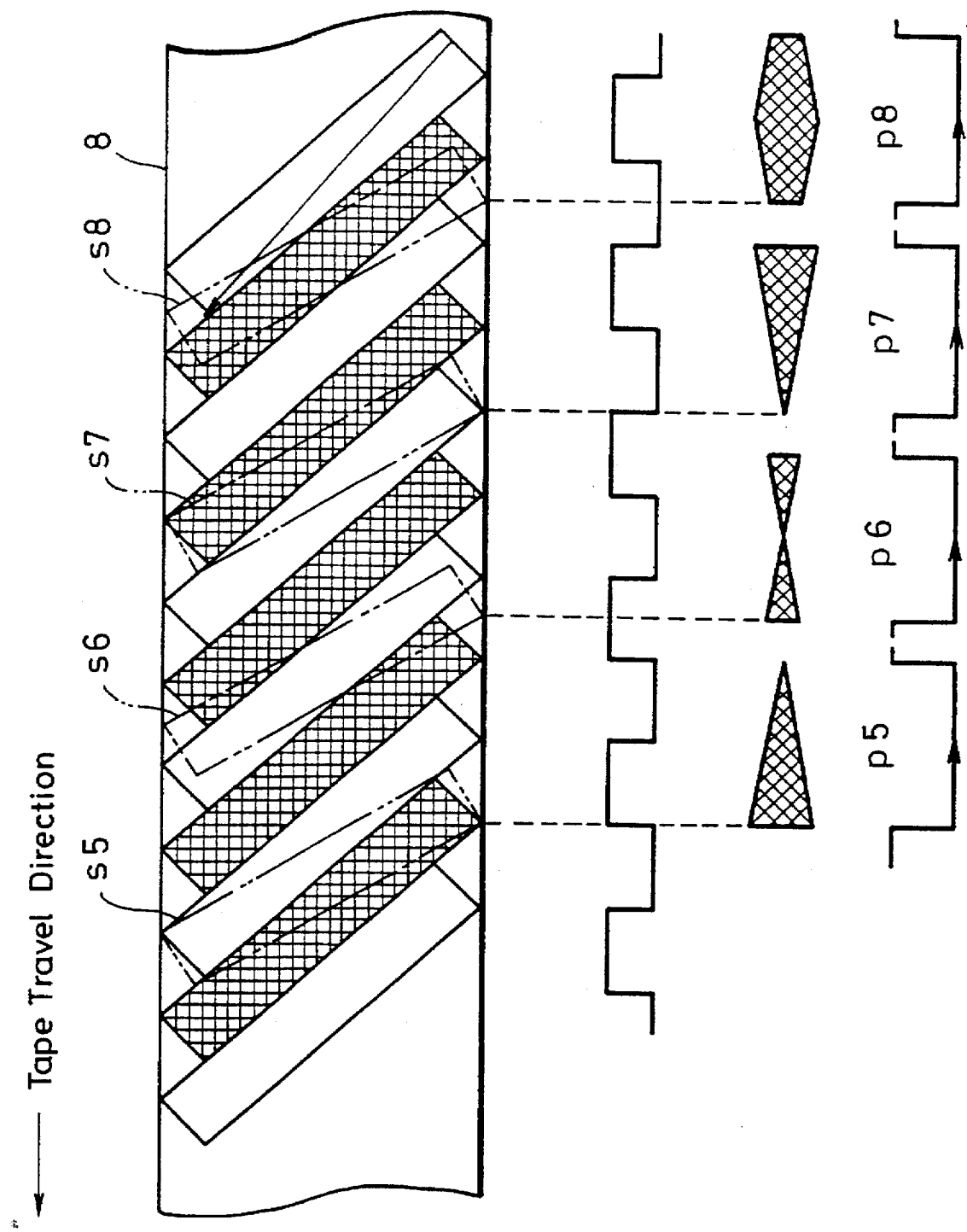

METHOD AND APPARATUS FOR GENERATING A CONTROL SIGNAL

This is a continuation of application Ser. No. 08/454,617 filed May 31, 1995, which is a continuation of Ser. No. 08/135,743 filed Oct. 12, 1993 both now abandoned.

BACKGROUND OF THE INVENTION

1. Field of the Invention

The present invention relates to a method of and apparatus for generating a control signal suitable for a video tape recorder (VTR) which is not provided with a control signal recording/reproducing stationary head, such as an 8-mm VTR or the like, for example.

2. Description of the Prior Art

Conventional VTRs having a ½-inch tape, a ¾-inch tape and a 1-inch tape use a track servo CTL signal (control pulse signal) recorded on a control track formed on a tape as a position reference signal to detect a tape position necessary for editing recorded video data and detect a current position on the tape by counting the pulses of the CTL signal.

The track servo of the VTR having a tape width of 8 mm uses a so-called automatic track finding (ATF) method and a CTL signal is not recorded on an 8-video tape. This ATF system is described in U.S. Pat. No. 4,594,615 or U.S. Pat. No. 4,658,309, for example.

Therefore, upon edit or the like, the following methods are used in order to detect the tape position. One of such methods is to count the number of bottoms and peaks of an envelope of a reproduced video signal (so-called RF signal) played back from a reproducing head.

This method, however, cannot provide an accurate value if the envelope of the reproduced video signal is not detected due to a dropout of the reproduced signal or the like. Consequently, there cannot be obtained accurate tape position information.

There is known the following method in which a time code is written on a user area such as a so-called PCMID (pulse code modulation identification) area or coding index area that is formed on a PCM audio data format on the 8-mm video tape format and a time code thus recorded is read out to detect the tape position.

This method, however, requires a time code generator and a time code reader, which unavoidably makes the apparatus expensive. Further, upon variable tape speed playback mode such as search mode or the like, a head is translated across a track on which a PCM audio signal is recorded so that an error occurs when the recorded time code is read out. Therefore, accurate tape position information cannot be obtained.

Further, there is known a method which detects a tape position by counting a frequency-divided pulse of a capstan rotation speed detection signal and a reel rotation detection signal or the like. However, this method is not based on an actual video signal recorded on the tape so that, when a slip takes place between the capstan and the tape or the tape is slackened, a position of the recorded video signal and the pulse position of the capstan rotation speed detection signal are displaced, thereby making it impossible to obtain accurate tape position information.

The assignee of the present application has previously proposed a video signal reproducing apparatus in which a phase of a capstan rotation speed frequency-divided pulse is corrected on the basis of tape speed information obtained from an RF output signal and a switching pulse signal and phase information between the RF output signal and the switching pulse signal to thereby form a pseudo-CTL signal indicative of an accurate position of the tape (see Japanese laid-open patent publication No. 2-292770).

However, the above-mentioned method of forming the pseudo-CTL signal cannot cope with a so-called linear search in which a picture is reproduced continuously and stopped at a desired position and a rotary phase modification (e.g., 0.8 time or 1.1 time, etc.) upon edit. Further, when the tape speed is switched from a first speed to a second speed, or under the condition that the tape is not played back, the pseudo-CTL pulse is placed in the free-running state so that accurate tape position information cannot be obtained.

Furthermore, since a capstan FG of the VTR generally corresponds to the tape length direction, there is provided an error ±x in order to become compatible with a tape recorded by another VTR. This error is 1/150, i.e., one pulse each is displaced relative to the capstan FG. There is then the disadvantage that the pseudo-CTL pulse is displaced in phase, or is placed in the free-running state.

OBJECTS AND SUMMARY OF THE INVENTION

Therefore, it is an object of the present invention to provide an improved method of and apparatus for generating a control signal in which the aforesaid shortcomings and disadvantages encountered with the prior art can be eliminated.

More specifically, it is an object of the present invention to provide a method of and apparatus for generating a control signal which can cope with a VTR which carries out a linear search, a VTR which carries out only a noise-less still playback and any phase of a guardband upon search.

It is another object of the present invention to provide a method of and apparatus for generating a control signal in which a pseudo-control pulse signal can be obtained with high accuracy even when a tape speed is being changed.

According to a first aspect of the present invention, there is provided a method of generating a control signal which comprises the steps of detecting a drum rotational amount on the basis of a switching signal which switches a plurality of rotary heads, detecting a displacement amount of a control signal on the basis of a signal indicative of the drum rotational amount and levels of reproduced signals from the plurality of rotary heads, detecting a rotary frequency of a capstan motor, generating a pseudo control signal by frequency-dividing a detected signal indicative of the rotary frequency of the capstan motor by a predetermined value, and correcting a phase of the pseudo-control signal generated on the basis of the signal indicative of the displacement amount of the control signal.

In accordance with a second aspect of the present invention, there is provided a method of generating a control signal which comprises the steps of detecting a drum rotational amount on the basis of a duration of a switching signal which switches a plurality of rotary heads, detecting a displacement amount of a control signal on the basis of a signal indicative of the drum rotational amount, levels of reproduced signals from the plurality of rotary heads when the level of the switching signal is changed and the succeeding change of the level of the reproduced signal, detecting a rotary frequency indicative of a rotational amount of a capstan motor, generating a pseudo control signal by frequency-dividing a detected signal indicative of the rotary frequency of the capstan motor by a predetermined value, and correcting a phase of the pseudo-control signal generated on the basis of the signal indicative of the displacement amount of the control signal.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 2A through 2D are diagrams showing the state that a waveform of an RF signal is changed when a tracking error occurs in the still playback mode, respectively;

FIGS. 4A through 4D are diagrams showing the state that the waveform of the RF signal is changed when a tracking error occurs in the twice normal speed playback mode, respectively;

DETAILED DESCRIPTION OF THE PREFERRED EMBODIMENT

A method of and apparatus for generating a control signal according to an embodiment of the present invention will hereinafter be described in detail with reference to the drawings.

Figure 1:
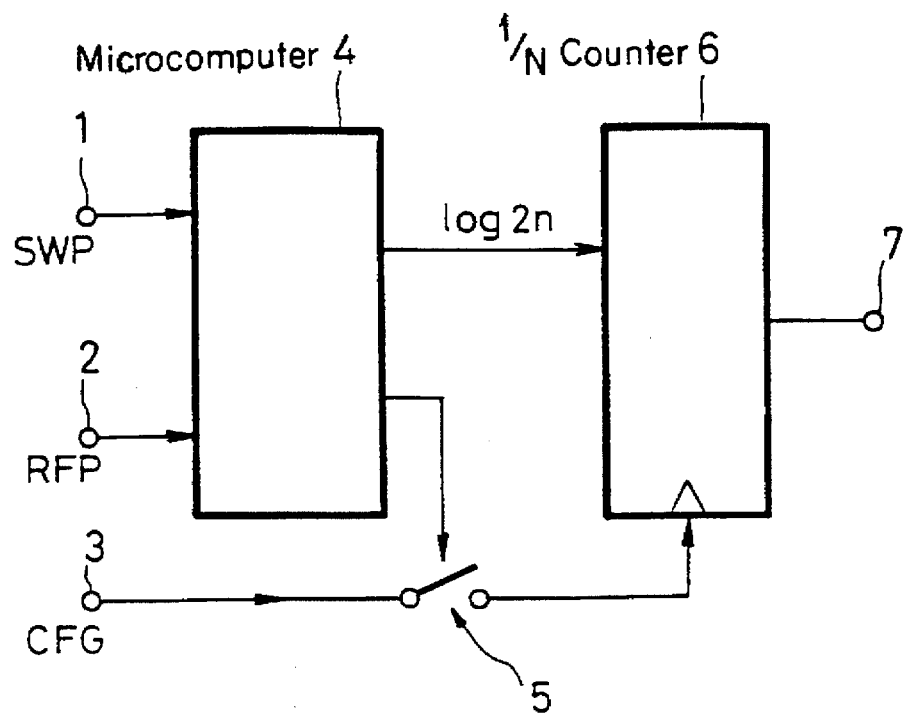
FIG. 1 is a block diagram showing a circuit arrangement of a control (CTL) signal generating apparatus according to an embodiment of the present invention.

As shown in FIG. 1 of the accompanying drawings, there is provided an input terminal 1 to which there is supplied a head switching signal SWP from a VTR body having no CTL head (e.g., 8-mm VTR body, etc.), not shown. There is provided an input terminal 2 to which there is supplied an RF signal RFP of a digital signal form obtained when an envelope-detected analog video signal from the similar VTR body, not shown, is processed by a comparator. Further, there is provided an input terminal 3 to which there is provided a frequency signal (FG signal) CFG obtained when a rotational amount of a capstan motor of the similar VTR body, not shown, is detected.

The switching pulse SWP and RF signal RFP are supplied through the input terminals 1 and 2 to a microcomputer 4. The microcomputer 4 is comprised of a ROM (read-only memory) in which data such as a program or the like are stored, a RAM (random access memory) for work area, a CPU (central processing unit), an input circuit, an output circuit, buses (address bus, data bus, control bus, etc.) or the like.

Because the RF level is detected only from the edge portion of the RF signal, the microcomputer 4 calculates a phase of the CTL signal at that moment and supplies a correction Signal log2n to a 1/N counter 6 so that the phase of the CTL signal becomes coincident with a calculated value. Exemplary frequency division circuits, or 1/N counters, are shown in *Electronic Circuits Manual*, McGraw-Hill, Inc., pp.266–273, New York, 1971 and *Electronic Circuits Manual*, McGraw-Hill, Inc., pp.294–299, New York, 1974.

The microcomputer 4 obtains a rotational amount of a drum by calculating a time from the edge of the switching pulse. When the RF signal decreases due to scratches on the tape or mis-contact between the tape and the head, the microcomputer 4 supplies a switching pulse to a switch 5 to allow the frequency signal CFG supplied thereto from the input terminal 3 to be supplied to an input terminal of the 1/N counter 6.

The 1/N counter 6 obtains a pseudo-CTL signal on the basis of the correction signal from the microcomputer 4 and supplies the same through the output terminal 7 to the VTR body, not shown. When the RF signal is dropped out and the switch 5 is turned on under the control of the microcomputer 4, the 1/N counter 6 divides the frequency signal CFG supplied thereto from the input terminal 3 to generate a signal having a frequency very near the CTL signal. The 1/N counter 6 supplies this signal through the output terminal 7 to the VTR body, not shown, as a pseudo-CTL signal used when the RF signal is dropped out.

Prior to the description of operation of the CTL signal generating apparatus shown in FIG. 1, how to generate the pseudo-CTL signal by the CTL signal generating circuit shown in FIG. 1 will be described with reference to FIGS. 2A through 5D. In order to facilitate the understanding of the present invention, an example of a VTR that is capable of the azimuth recording, in particular, the single azimuth head playback will be described by way of example. It is needless to say that the VTR that is capable of the double azimuth head playback can be operated similarly.

A magnetic tape 8 shown in FIGS. 2A, 4A and 5A will be described initially. As illustrated, tracks formed on the magnetic tape 8 as shown by solid lines are formed by an Ach (i.e., A channel) video head and a Bch (i.e., B channel) video head mounted on a rotary head (not shown) in a substantially opposing fashion.

A video track shown cross-hatched is a track formed by the Ach video head and a remaining track B is a track formed by the Bch video head. The Ach video head and the Bch video head scan the tracks in the direction shown by a bold arrows in the figure, and the magnetic tape 8 is transported in the direction shown by an arrow (from right to left). In the following description, only the Ach video head will be described. It is needless to say that the same operation can be made by the Bch video head.

FIGS. 2A through 2D are diagrams showing the change of the RF signal waveform obtained when the tracking error occurs in the still playback mode, respectively. When the Ach video head scans the track in the direction shown by a bold solid arrow as shown in FIG. 2A, then a scanned locus becomes as shown by a two-dot chain line in FIG. 2A. FIG. 2B shows a waveform of a CTL signal (pseudo-CTL pulse) that is assumed to be recorded on the magnetic tape 8.

FIG. 2C shows a waveform of the RF signal, and FIG. 2D shows a waveform of a switching pulse. The assumed CTL pulse shown in FIG. 2B has a waveform such that its leading edge corresponds to the video track A formed by the Ach video head and its trailing edge corresponds to the video track B formed by the Bch video head.

Operation done by the CTL signal generating apparatus when the Ach video head scans the track as shown by a locus s1 will be described. When the drum entrance portion is considered, or the switching pulse shown in FIG. 2D is changed, a switching pulse p1 shown in FIG. 2D and an RF signal shown in FIG. 2C or the assumed CTL pulse shown in FIG. 2B have no phase displacement therebetween and the Ach video head is placed in a so-called just-tracking state with the cross-hatched video track as shown in FIG. 2A. More specifically, the RF level becomes maximum at the starting portion in which the cross-hatched portion of the track and the locus s1 of the Ach video head overlap each other as shown in FIG. 2A. The RF level is lowered as the overlapping portion between the cross-hatched portion of the track and the locus s1 of the Ach video head is reduced and the tracking is displaced.

Operation done by the CTL signal generating apparatus when the Ach video head scans the track as shown by a locus s2 will be described next. At the portion in which the Ach video head starts scanning the magnetic tape 8, the switching pulse p2 shown in FIG. 2D and the RF signal shown in FIG. 2C or the assumed CTL pulse shown in FIG. 2B are displaced in phase by 90 degrees and the Ach video head is not placed in the just-tracking state. Therefore, the RF level is small. When the Ach video head scans the track at its substantially intermediate position, or the overlapping portion between the cross-hatched portion of the track and the locus s2 is maximum, the Ach video head is placed in the just-tracking state so that the RF level becomes maximum.

Operation done by the CTL signal generating apparatus when the Ach video head scans the track as shown by a locus s3 will be described below. At the portion where the Ach video head starts scanning the magnetic tape 8, a switching pulse p3 shown in FIG. 2D and the RF signal shown in FIG. 2C or the assumed CTL pulse shown in FIG. 2B are displaced in phase by 180 degrees and the Ach video head is not placed in the just-tracking state so that the RF level is small. When the Ach video head scans the track up to its upper end, or the overlapping portion between the cross-hatched portion of the track and the locus s3 is maximum, the Ach video head is placed in the just-tracking state so that the RF level becomes maximum.

Operation done by the CTL signal generating apparatus when the Ach video head scans the track as shown by a locus s4 will be described next. At the portion where the Ach video head starts scanning the magnetic tape 8, a switching pulse p4 shown in FIG. 2D and the RF signal shown in FIG. 2C or the assumed CTL pulse shown in FIG. 2B are displaced in phase by 270 degrees and the Ach video head is not placed in the just-tracking state so that the RF level is small. Even when the Ach video head scans the track up to its upper end, the cross-hatched portion of the track and the locus s3 do not overlap each other substantially so that the RF level is small on the whole.

Therefore, noticing the tracking state of the Ach video head at the drum entrance portion, the RF level corresponding to the drum entrance portion is lowered as the tracking of the drum entrance portion is shifted as in s1, s2 and s3. Further, the RF level corresponding to the drum entrance portion is increased as the tracking of the drum entrance portion is matched as in s3, s4 and s1.

As is clear from the above description, the tracking state can be detected by watching the RF level, which shows that, in the drum entrance corresponding portion, the position at which the CTL head is placed on the CTL track at that moment, i.e., the phase of the assumed CTL pulse can be detected by observing the RF level.

Figure 3:
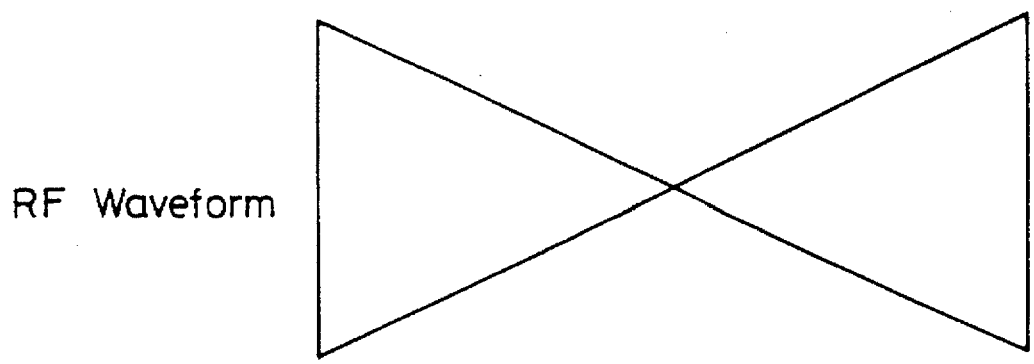
FIG. 3 is a diagram showing a relationship between the level of the RF signal and the phase of the CTL signal in the still playback mode according to the present invention.

FIG. 3 shows a relationship between the RF level and the phase of the CTL pulse at that time. As shown in FIG. 3, in the still playback mode, the RF level becomes maximum when the phase of the CTL pulse is at 360 degrees and 0 degree. The RF level is progressively lowered when the phase of the CTL pulse is in a range of from 360 degrees to 180 degrees. The RF level is progressively increased when the phase of the CTL pulse is in a range of from 180 degrees to 0 degree.

FIGS. 4A through 4D show a relationship between the tracking state and the RF signal waveform when the Ach video head is operated in the twice normal speed playback mode in the positive direction. As shown in FIG. 4A, when the Ach video head scans the track in the direction shown by a bold solid line, the scanning locus becomes as shown by a two-dot chain line in FIG. 4A. At that time, FIG. 4B shows a waveform of a CTL signal (assumed CTL pulse) that is assumed to be recorded on the magnetic tape 8.

FIG. 4C shows a waveform of the RF signal, and FIG. 4D shows a waveform of a switching pulse. The assumed CTL pulse shown in FIG. 4B has a waveform such that its leading edge corresponds to the video track A formed by the Ach video head and its trailing edge corresponds to the video track B formed by the Bch video head.

Operation done by the CTL signal generating apparatus when the Ach video head scans the track as shown by a locus s5 will be described. Noticing the drum entrance portion, or the state that the switching pulse shown in FIG. 4D is changed, a switching pulse p5 shown in FIG. 4D and the RF signal shown in FIG. 4C or the assumed CTL pulse shown in FIG. 4B have no phase displacement therebetween. Also, the Ach video head is placed in the just-tracking state with the video track of the cross-hatched portion. Therefore, in the starting portion of the portion where the cross-hatched portion of the track and the locus s1 of the Ach video head overlap each other, the RF level is maximum. The RF level is lowered as the overlapping portion between the cross-hatched portion of the track and the locus s2 of the head is decreased and the tracking is displaced.

Operation done by the CTL signal generating apparatus when the Ach video head scans the track as shown by a locus s6 will be described. At the portion where the Ach video head starts scanning the magnetic tape 8, a switching pulse p6 shown in FIG. 4D and the RF signal shown in FIG. 4C or the assumed CTL pulse shown in FIG. 4B are displaced in phase by 90 degrees and the Ach video head is not placed in the just-tracking state so that the RF level is small on the whole.

Operation done by the CTL signal generating apparatus when the Ach video head scans the track as shown by a locus s7 will be described. At the portion where the Ach video head starts scanning the magnetic tape 8, a switching pulse p7 shown in FIG. 4D and the RF signal shown in FIG. 4C or the assumed CTL pulse shown in FIG. 4B are displaced in phase by 180 degrees and the Ach video head is not placed in the just-tracking state so that the RF level is small. When the Ach video head scans the track up to its upper end, or the overlapping portion between the cross-hatched portion of the track and the locus s7 is maximum, the Ach video head is place in the just-tracking state so that the RF level becomes maximum.

Operation done by the CTL signal generating apparatus when the Ach video head scans the track as shown by a locus s8 will be described. At the portion where the Ach video head starts scanning the magnetic tape 8, a switching pulse p8 shown in FIG. 4D and the RF signal shown in FIG. 4C or the assumed CTL pulse shown in FIG. 4B are displaced in phase by 270 degrees and the Ach video head is not placed in the just-tracking state so that the RF level is small. When the Ach video head scans the track up to its intermediate position, or the Overlapping portion between the cross-hatched portion of the track and the locus s8 is maximum, the RF level becomes maximum.

Therefore, noticing the tracking state of the drum entrance portion of the Ach video head, the RF level corresponding to the drum entrance portion is lowered as the tracking at the drum entrance portion is displaced as in s5, s6 and s7. Further, the RF level corresponding to the drum entrance portion is increased as the tracking at the drum entrance portion is matched as in s7, s8 and s5. A relationship between the RF level and the phase of the CTL pulse at that time becomes a pattern opposite to that shown in FIG. 3. More specifically, upon twice normal speed playback mode, the RF level becomes maximum when the phase of the CTL pulse is at 360 degrees and 0 degree. The RF level is progressively lowered when the phase of the CTL pulse is in a range of from 0 degree to 180 degrees. The RF level is progressively increased when the phase of the CTL pulse is in a range of from 180 degrees to 360 degrees. Accordingly, in this case, this relationship becomes opposite to the relationship between the RF level and the phase of the CTL pulse presented in the still playback mode earlier described with reference to FIGS. 2 and 3. This occurs depending on the scanning angle of the video head relative to the video track. More specifically, this difference is produced when the video head scans the lower portion of the track or the upper portion of the track. If the video head scans the lower portion of the track, the area of track scanned by the video head is increased as the phase of the CTL pulse is advanced. Conversely, when the video head scans the upper portion of the track, the area of the track scanned by the video head is decreased as the phase of the CTL pulse is advanced.

That is to say, in the reverse direction search mode and in the positive direction search mode at speed less than one time normal speed, there can be utilized the pattern that is described in the still playback mode shown in FIG. 3. In the positive direction search mode at speed greater than one time normal speed, the pattern that is opposite to the pattern described in the twice normal speed playback mode shown in FIG. 4C must be utilized.

More specifically, in the positive direction search mode at speed one time normal speed, the pattern is such that, as earlier noted with reference to the twice normal speed playback mode, the RF level becomes maximum when the phase of the CTL pulse is at 0 degree and 360 degrees, the RF level is progressively lowered when the phase of the CTL signal is in a range of from 0 degree to 180 degrees and that the RF level is increased when the phase of the CTL pulse is in a range of from 180 degrees to 360 degrees.

Although only the Ach video head has been described so far, this is also true for the Bch video head. In this case, however, the phase of the CTL pulse is generally 0 degree in the Ach video track and 180 degrees in the Bch video track so that the phase of the CTL pulse is displaced by 180 degrees when the RF level of the Bch video head is considered in the relationship between the RF level and the phase of the CTL pulse.

Figures 5A, 5B, 5C, 5D:
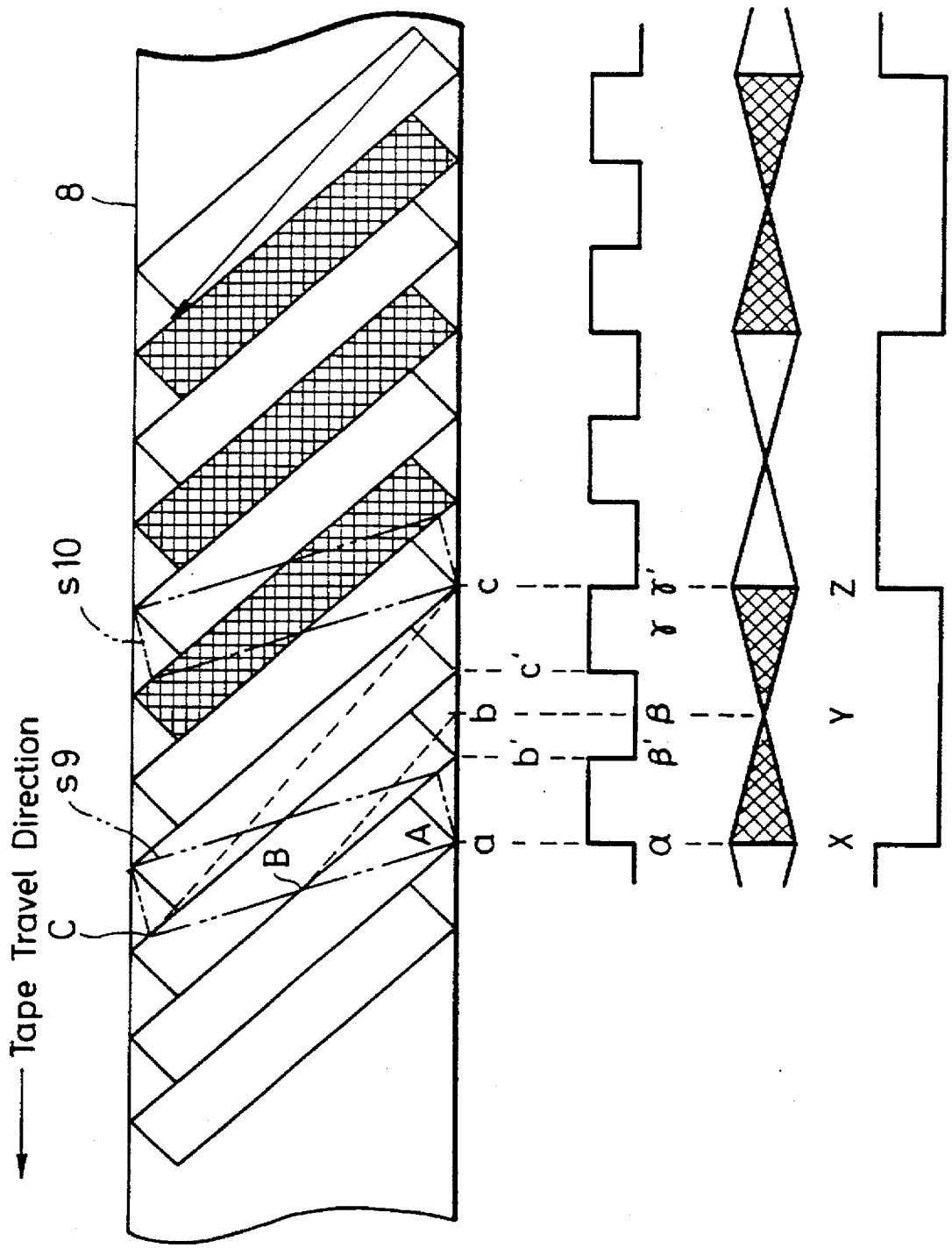
FIGS. 5A through 5D are diagrams showing the state that the waveform of the RF signal is changed when a tracking error occurs in the three times normal speed playback mode, respectively.

FIGS. 5A through 5D are diagrams showing a relationship between the tracking state and the RF signal waveform presented when the three times normal speed playback is carried out in the positive direction. As shown in FIG. 5A, when the Ach video head scans the track in the direction shown by a bold solid line, the scanning locus becomes as shown by a two-dot chain line in FIG. 5A. At that time, FIG. 5B shows a waveform of a CTL signal (assumed CTL pulse) that is assumed to be recorded on the magnetic tape 8.

Further, FIG. 5C shows the waveform of the RF signal, and FIG. 5D shows the waveform of the switching pulse.

The assumed CTL pulse shown in FIG. 5B has a waveform such that its leading edge corresponds to the video track A formed by the Ach video head and its trailing edge corresponds to the video track B formed by the Bch video head.

As shown in FIG. 5A, in the case of the three times normal speed playback mode, a locus of the head as shown by a two-dot chain line becomes more upright as compared with the case of the twice normal speed playback mode in the positive direction described with reference to FIG. 4.

As the Ach video head scans the track as in A, B and C as shown by a locus s9, as shown in FIGS. 5B and 5C, the CTL head position (assumed position), the phase of CTL pulse (phase of assumed CTL pulse) and the RF level are changed to (a, α,X)→(b, β, Y)→(c, γ, ZX), respectively.

A relationship between the RF signal and the CTL signal will be considered. Although the pattern shown in FIG. 4 opposite to the pattern shown in FIG. 3 is presented at a position A corresponding to the drum entrance portion, such pattern is not established in positions B and C in FIG. 5.

Considering this pattern, since the RF level is 0% at the position B, the phase of the CTL signal should be located at a position b' of 180 degrees but the phase of the CTL signal is located at a position b in actual practice. This is caused by an angular difference between the video track and the still angle. When the drum is rotated by 180 degrees (when the Ach video head scans the track from the position A to the position B), there occurs a displacement of one track amount (=180 degrees in view of the phase of the CTL pulse). This is also true for a locus s10, though not shown.

Summarizing the description shown in FIGS. 2A to 5B, it is to be appreciated that the CTL phase is expressed by (tracking displacement calculated by the RF level)+ (rotational amount of drum).

At the intermediate position (equivalent to the position B in FIG. 5A) in the locus s5 shown in FIG. 4A, for example, the RF level is 100% and the drum rotational amount is 90 degrees so that the CTL phase becomes (180 degrees)+(90 degrees)=270 degrees=position of p7 in FIG. 4.

Operation of the microcomputer 4 shown in FIG. 1 will be described with reference to flowcharts forming FIGS. 6 to 8.

Figure 6:
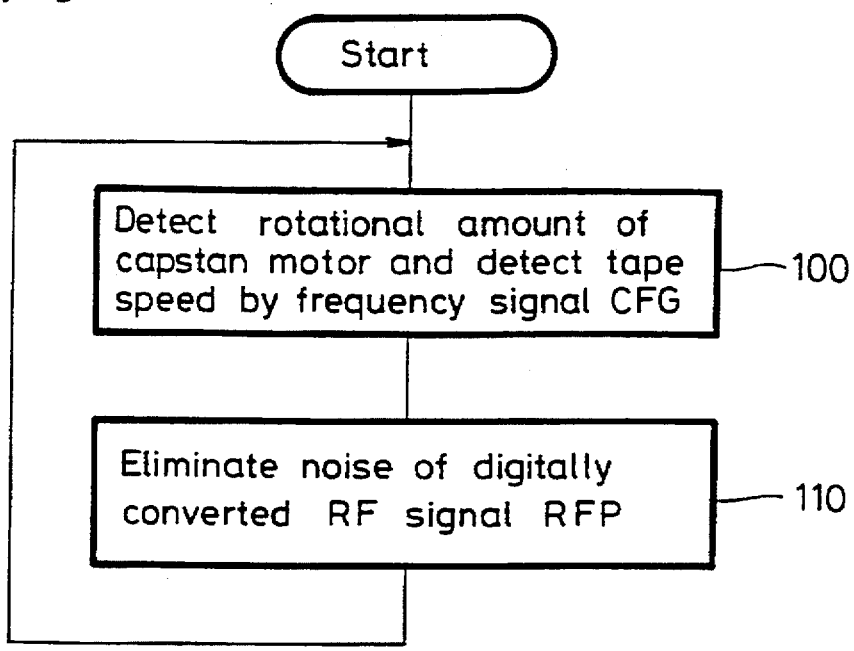
FIGS. 6 to 8 are flowcharts to which references will be made in explaining operation of a microcomputer according to the present invention, respectively.

Referring to FIG. 6, in step 100, a rotational amount of the capstan motor is detected and a tape speed is detected by a resultant frequency signal (FG signal) CFG, and then the processing proceeds to step 110.

In step 110, a noise of an RF signal that is digitally converted when an analog video signal is processed by envelope-detection and a comparator is eliminated, and then the processing returns to step 100. Since the RF signal is converted into the digital signal and then supplied to the microcomputer 4 as described above, a noise of the RF signal can be eliminated by a program.

Figure 7:
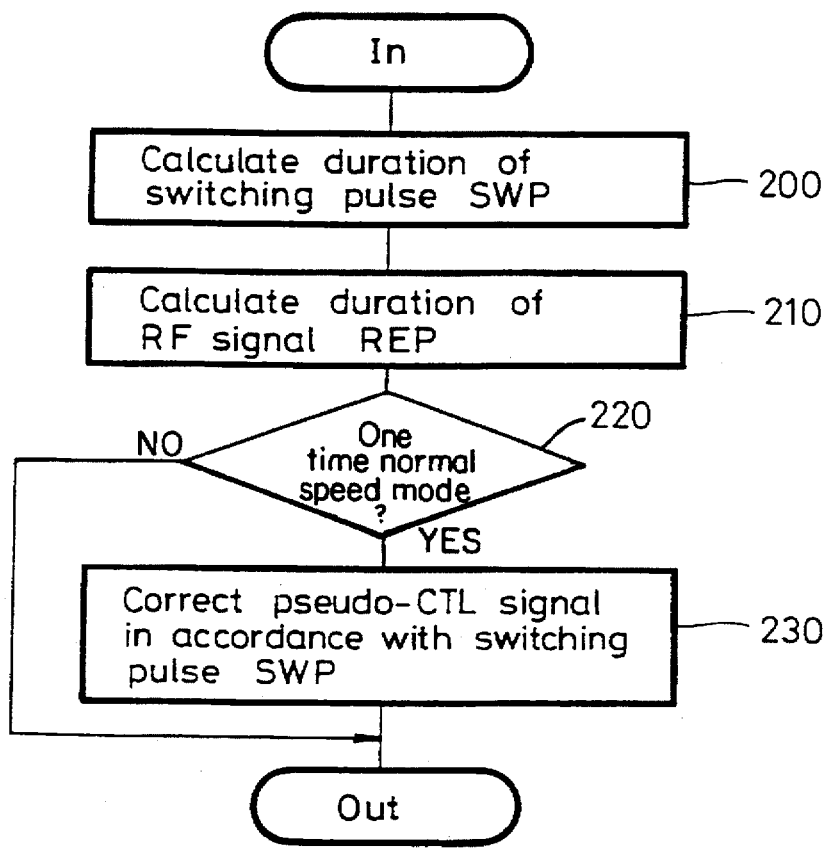

Referring to FIG. 7, in step 200, a duration of the switching pulse SWP is calculated, and then the processing proceeds to step 210. In the next step 210, a duration of the RF signal RFP is calculated, and then the processing proceeds to the next decision step 220. It is determined in decision step 22 whether or not the playback mode is one time normal speed playback mode. If a YES is output at decision step 220, then the processing proceeds to step 230. If on the other hand a NO is output at decision step 230, then the processing goes out from this routine. In step 230, the pseudo-CTL signal is corrected in accordance with the switching pulse SWP. Then, the processing goes out from this routine.

Figure 8:
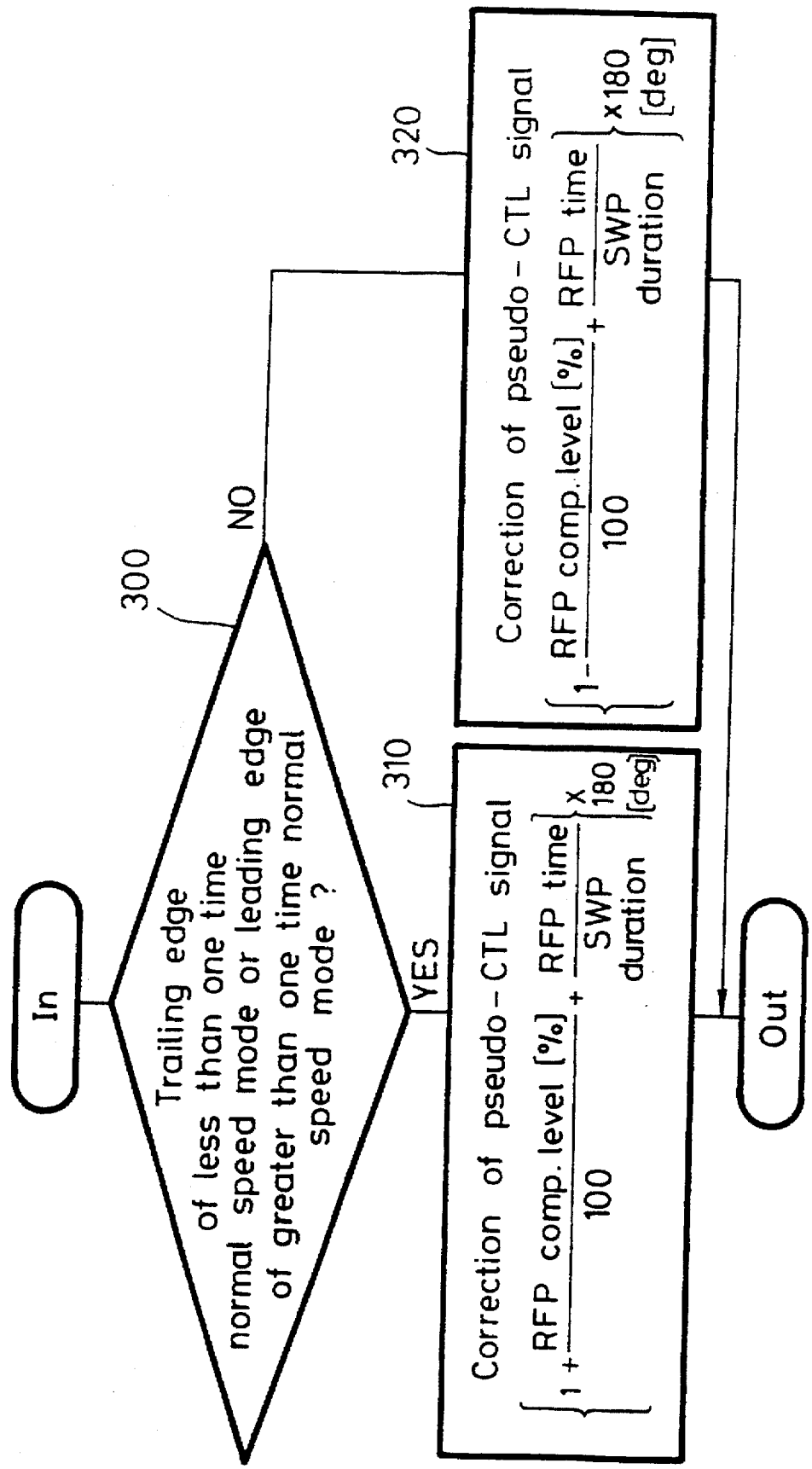

As shown in FIG. 8, it is determined in decision step 300 whether the edge is the trailing edge of less than one time normal speed mode or the leading edge of greater than one time normal speed mode. If a YES is output at decision step 300, then the processing proceeds to step 310. If on the other hand a NO is output at decision step 300, then the processing proceeds to step 320. In step 310, the correction of the pseudo-CTL signal is carried out by the calculation expressed by the following equation (1):

$$\{1+(RF\ compared\ level\ \{\%\}/100)+(RF\ time/SWP\ duration)\}\times180\ [deg] \quad (1)$$

In step 320, the correction of the pseudo-CTL signal is carried out by the calculation expressed by the following equation (2):

$$\{1-(RF\ compared\ level\ [\%]/100)+(RF\ time/SWP\ duration)\}\times180\ [deg] \quad (2)$$

Then, the processing goes out from this routine.

As described above, according to this embodiment, the tracking displacement is calculated on the basis of the level of the RF signal and the drum rotational amount is detected by measuring the time of the switching pulse. Then, the phase of the CTL signal is detected by adding these detected values and the pseudo-CTL signal is generated on the basis of the detected phase of the CTL signal. Also, when the RF signal decreases, the pseudo-CTL signal is generated by frequency-dividing the frequency signal obtained from the rotational speed of the capstan motor. Therefore, the present invention can cope with the VTR which carries out the linear search and the VTR which can carry out only the noiseless still playback. Further, the apparatus of the present invention can be operated regardless of the phase of the guardband upon search. Thus, even while the tape speed is being changed, the pseudo-CTL signal can be obtained with high accuracy.

While the microcomputer is used to calculate the phase of the CTL signal as described above, such calculation is simple so that the calculation process can be carried out by the hardware. While the RF signal is converted into the digital signal and the waveform that results from frequency-dividing the frequency signal is corrected by the RF signal, the present invention is not limited thereto. Conversely, the pseudo-CTL signal may be generated by monitoring the RF level in an analog fashion and such signal may be corrected by the frequency of the frequency signal.

According to the present invention mentioned above, a drum rotational amount is detected by the phase detecting means on the basis of the head switching signal that switches a plurality of rotary heads. The displacement amount of the CTL signal is detected on the basis of the reproduced signals from a plurality of rotary heads. The rotational frequency of the capstan motor is detected by the frequency detector, and the CTL signal generating circuit generates in a pseudo-fashion the CTL signal by frequency-dividing the frequency signal from the frequency detector. Then, the phase of the CTL signal generated from the CTL signal generating circuit is corrected on the basis of the detection signal from the phase detecting means. Therefore, the present invention can cope with the VTR which carries out the linear search, the VTR which carries out only the noise-less still playback and any phase of the guardband upon search. Thus, even while the tape speed is being changed, the pseudo-CTL signal can be obtained with high accuracy.

Further, according to the present invention, since the phase detecting means detects the displacement amount of the CTL signal on the basis of the duration of the head switching signal and the change of level of the reproduced signal, the circuit arrangement can be simplified in addition to the above-mentioned effects.

Further, according to the present invention, since the phase detecting means detects the displacement amount of the CTL signal on the basis of the change of level of the reproduced signal when the head switching signal is changed, the CTL signal of high accuracy can be generated in addition to the above-mentioned effects.

Furthermore, according to the present invention, since the change of level of the reproduced signal is detected by the comparison with the reference level signal, the CTL signal of high accuracy can be generated in addition to the above-mentioned effects.

Furthermore, according to the present invention, since the level of the reproduced signal is detected on the fact that the level of the reproduced signal is progressively lowered when the phase of the CTL signal is in a range of from 360 degrees to 180 degrees and the level of the reproduced signal is progressively increased when the phase of the CTL signal is in a range of from 180 degrees to 360 degrees in the reverse direction search and in the forward direction search mode of less than one time normal speed, the detection process can be made simple and high in accuracy in addition to the above-mentioned effects.

In addition, according to the present invention, since the level of the reproduced signal is detected on the fact that the level of the reproduced signal is progressively lowered when the phase of the CTL signal is in a range of from 0 degree to 180 degrees in the forward direction search mode of greater than one time normal speed and the level of the reproduced signal is progressively increased when the phase of the CTL signal is in a range of from 180 degrees to 360 degrees, the detection process can be made simple and high in accuracy in addition to the above-mentioned effects.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A method of generating a pseudo tracking control signal for a helical scan rotary head drum tape recorder from a tape upon which information signals are recorded in the absence of a recorded control signal, comprising the steps of:

determining a rotational amount of the head drum on the basis of a head switching signal that is used to switch a plurality of heads on the rotary head drum;

detecting a level of a reproduced RF signal;

generating a control phase-correction signal for driving the pseudo tracking control signal to a target value corresponding to the absent control signal based on the determined head drum rotational amount and the detected RF signal level;

connecting the control phase-correction signal to a 1/N counter;

providing a pulsed frequency signal corresponding to a rotary frequency of a tape drive capstan motor;

detecting when the level of the reproduced RF signal increases or decreases substantially;

connecting the pulsed-frequency signal to the 1/N counter in response to detection of the RF signal increase or decrease;

dividing the pulsed frequency signal by N in the 1/N counter to correct the phase of the divided pulsed frequency signal to approximate the target value, whereby N is adjusted in response to the control phase-correction signal; and outputting the phase corrected 1/N divided signal as the pseudo tracking control signal.

\* \* \* \* \*